United States Patent
Sudo et al.

(10) Patent No.: US 9,023,937 B2
(45) Date of Patent: May 5, 2015

(54) METHOD FOR PRODUCING A RUBBER COMPOSITION

(75) Inventors: Takuya Sudo, Ichihara (JP); Hisakatsu Hama, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/483,664

(22) Filed: May 30, 2012

(65) Prior Publication Data

US 2012/0309894 A1    Dec. 6, 2012

(30) Foreign Application Priority Data

Jun. 1, 2011  (JP) ................. 2011-123160

(51) Int. Cl.
| | |
|---|---|
| C08C 19/20 | (2006.01) |
| C08C 19/25 | (2006.01) |
| C08K 3/36 | (2006.01) |
| C08K 5/54 | (2006.01) |
| C08K 5/548 | (2006.01) |
| C08J 3/20 | (2006.01) |

(52) U.S. Cl.
CPC ................. *C08K 5/548* (2013.01); *C08C 19/20* (2013.01); *C08C 19/25* (2013.01); *C08K 5/54* (2013.01); *C08J 3/203* (2013.01); *C08J 2309/00* (2013.01); *C08K 3/36* (2013.01)

(58) Field of Classification Search
CPC .......... C08C 19/20; C08C 19/25; C08K 3/36; C08K 5/54; C08K 5/548; C08L 9/00; C08J 2309/00
USPC .................................................. 524/572, 580
See application file for complete search history.

(56) References Cited

U.S. PATENT DOCUMENTS

| | | | |
|---|---|---|---|
| 2002/0082334 A1 | 6/2002 | Kobayashi et al. | |
| 2012/0071603 A1 * | 3/2012 | Hayano et al. | ................ 524/571 |

FOREIGN PATENT DOCUMENTS

| | | | |
|---|---|---|---|
| JP | 6-248117 | * | 9/1994 |
| JP | 06248117 A | | 9/1994 |
| JP | 2002201309 A | | 7/2002 |
| WO | WO 2010/131646 A1 | * | 11/2010 |

OTHER PUBLICATIONS

Machine translation of JP 6-248117; Sep. 1994.*

* cited by examiner

*Primary Examiner* — Roberto Rabago
(74) *Attorney, Agent, or Firm* — Panitch Schwarze Belisario & Nadel LLP

(57) ABSTRACT

A method for producing a rubber composition, the method comprising a step of producing a pre-kneaded rubber composition by kneading a butadiene-based rubber and 1 to 20 parts by weight of a silane coupling agent per 100 parts by weight of the butadiene-based rubber and a step of kneading the pre-kneaded rubber composition and 30 to 200 parts by weight of a silica per 100 parts by weight of the butadiene-based rubber used for producing the pre-kneaded rubber composition.

8 Claims, No Drawings

METHOD FOR PRODUCING A RUBBER COMPOSITION

TECHNICAL FIELD

The present invention relates to a method for producing a rubber composition.

BACKGROUND ART

In recent years, because of growing concern with environmental problems, demand to automobiles for fuel saving has increased and rubber compositions to be used for tires are also required to be superior in fuel saving efficiency. As rubber compositions for treads of tires, there have been used rubber compositions in which reinforcing agents such as silica are blended into diene-based rubbers such as polybutadiene and styrene-butadiene copolymers.

When silica is blended as a reinforcing agent into a diene-based rubber, a silane coupling agent is further blended in order to improve an affinity of the diene-based rubber and the silica, thereby improving the dispersibility of the silica. As a method for producing a rubber composition comprising a diene-based rubber, a silica reinforcing agent, and a silane coupling agent, a method for producing a rubber composition has been proposed, as disclosed in patent document 1, in which a diene-based rubber and a silica reinforcing agent are kneaded to prepare a pre-kneaded composition and then the pre-kneaded composition and a silane coupling agent are kneaded.

PRIOR ART DOCUMENTS

Patent Documents

[Patent Document 1]
JP 2002-201309 A

SUMMARY OF THE INVENTION

Problems to be Solved by the Invention

A vulcanized rubber composition obtained by vulcanizing the rubber composition produced by the above-mentioned method is used as a tread of a tire. However, the vulcanized rubber composition was satisfactory enough in neither fuel saving efficiency nor gripping property when being used as a tread of a tire.

Under such circumstances, the problem to be solved by the present invention is to provide a method for producing a rubber composition suitable as a raw material of a vulcanized rubber composition from which a tire superior in fuel saving efficiency and gripping property is obtained when the vulcanized rubber composition are used for the tread of the tire and provide a method for producing a vulcanized rubber composition using the rubber composition.

Means for Solving the Problems

The present invention relates to a method for producing a rubber composition, the method comprising a step of producing a pre-kneaded rubber composition by kneading a butadiene-based rubber and 1 to 20 parts by weight of a silane coupling agent per 100 parts by weight of the butadiene-based rubber, and a step of kneading the pre-kneaded rubber composition and 30 to 200 parts by weight of silica per 100 parts by weight of the butadiene-based rubber used for producing the pre-kneaded rubber composition.

Furthermore, the present invention relates to a method for producing a vulcanizable rubber composition, the method comprising a step of kneading a vulcanizing agent and a rubber composition produced by the above-described method.

Furthermore, the present invention relates to a method for producing a vulcanized rubber composition, the method comprising a step of heating a vulcanizable rubber composition produced by the above-described method.

Advantageous Effects of the Invention

According to the present invention, there can be obtained a rubber composition suitable as a vulcanized rubber composition from which a tire superior in fuel saving efficiency and gripping property can be obtained when it is used for the tread of the tire, and a vulcanized rubber composition from which a tire superior in fuel saving efficiency and gripping properties can be obtained.

MODE FOR CARRYING OUT THE INVENTION

<Butadiene-Based Rubber>

The butadiene-based rubber in the present invention is a rubber composed of a polymer containing butadiene as monomer units. Examples of such butadiene-based rubber include a styrene-butadiene copolymer rubber (SBR), a polybutadiene rubber (BR), a butadiene-isoprene copolymer rubber, an acrylonitrile-butadiene rubber (NBR), and a styrene-isoprene-butadiene terpolymer rubber. The butadiene-based rubber to be used in the present invention is preferably a styrene-butadiene copolymer rubber or a polybutadiene rubber. Two or more butadiene-based rubbers may be used.

The butadiene-based rubber may have been modified with a modifier such as a ketone or an amide at its polymer chain terminals.

The Mooney viscosity ($ML_{1+4}$) of the butadiene-based rubber measured at 100° C. is preferably 10 or more, more preferably 20 or more. In order to improve processability, it is preferably 200 or less, more preferably 150 or less. The Mooney viscosity ($ML_{1+4}$) is measured in accordance with JIS K6300 (1994).

<Silane Coupling Agent>

Examples of the silane coupling agent in the present invention include alkoxysilane compounds having a sulfur-containing group, alkoxysilane compounds having an amino group, alkoxysilane compounds having an epoxy group, alkoxysilane compounds having a vinyl group, alkoxysilane compounds having an acrylic group, alkoxysilane compounds having a methacryl group, alkoxysilane compounds having a styryl group, alkoxysilane compounds having an ureido group, alkoxysilane compounds having an isocyanate group, and alkoxysilane compounds having a halogen atom; alkoxysilane compounds having a sulfur-containing group are preferred.

Examples of the sulfur-containing group include a mercapto group, a thioester group, a thiocyanato group, and a polysulfide group; a polysulfide group is preferred.

Examples of alkoxysilane compounds having a mercapto group include 3-mercaptopropyltrimethoxysilane, 3-mercaptopropyltriethoxysilane, and 3-mercaptopropylmethyldimethoxysilane. Examples of alkoxysilane compounds having a thioester group include 3-octanoylthio-1-propyltriethoxysilane. Examples of alkoxysilane compounds having a thiocyanato group include 3-tiocyanatopropyltriethoxysilane.

Examples of alkoxysilane compounds having a polysulfide group include compounds represented by Formula (2):

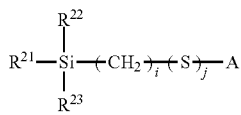

(2)

wherein $R^{21}$, $R^{22}$, and $R^{23}$ each represent an alkyl group or an alkoxy group, at least one group selected from among $R^{21}$, $R^{22}$, and $R^{23}$ is an alkoxy group, A represents a group selected from the group consisting of dialkylthiocarbamyl groups, a thiazolyl group, a benzothiazolyl group, and alkoxysilylalkyl groups, i represents an integer of 1 to 5, and j represents an integer of 2 to 8.

In Formula (2), $R^{21}$, $R^{22}$ and $R^{23}$ each represent an alkyl group or an alkoxy group, and at least one group selected from among $R^{21}$, $R^{22}$ and $R^{23}$ is an alkoxy group. Preferably, at least two groups selected from among $R^{21}$, $R^{22}$ and $R^{23}$ are alkoxy groups. More preferably, $R^{21}$, $R^{22}$ and $R^{23}$ are alkoxy groups.

$R^{21}$, $R^{22}$ and $R^{23}$ are each an alkyl group or alkoxy group preferably having 1 to 8, more preferably 1 to 6, even more preferably 1 to 4, and particularly preferably 1 to 2 carbon atoms.

Examples of the alkyl group of $R^{21}$, $R^{22}$ and $R^{23}$ include a methyl group, an ethyl group, a n-propyl group, an isopropyl group, a n-butyl group, an isobutyl group, a sec-butyl group, a tert-butyl group, a n-pentyl group, a n-hexyl group, and a n-octyl group. A methyl group and an ethyl group are preferred.

Examples of the alkoxy group of $R^{21}$, $R^{22}$ and $R^{23}$ include a methoxy group, an ethoxy group, a n-propoxy group, and a n-butoxy group. A methoxy group and an ethoxy group are preferred.

Preferably, $R^{21}$, $R^{22}$ and $R^{23}$ are groups each selected from the group consisting of a methoxy group, an ethoxy group, a methyl group, and an ethyl group and at least two groups selected from among $R^{21}$, $R^{22}$ and $R^{23}$ are each a methoxy group or an ethoxy group. More preferably, $R^{21}$, $R^{22}$ and $R^{23}$ are each a methoxy group or an ethoxy group.

In Formula (2), i represents an integer of 1 to 5, preferably 2 or 3.

In Formula (2), j represents an integer of 2 to 8, preferably an integer of 2 to 5.

In Formula (2), A represents a group selected from the group consisting of dialkylthiocarbamyl groups, a thiazolyl group, a benzothiazolyl group, and alkoxysilylalkyl groups.

Examples of the dialkylthiocarbamyl groups include a dimethylthiocarbamyl group and a diethylthiocarbamyl group.

Examples of the alkoxysilylalkyl groups include groups represented by Formula (2-S):

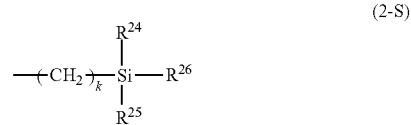

(2-S)

wherein $R^{24}$, $R^{25}$ and $R^{26}$ each represent an alkyl group or an alkoxy group, at least one group selected from among $R^{24}$, $R^{25}$ and $R^{26}$ is an alkoxy group, and k represents an integer of 1 to 5.

In Formula (2-S), $R^{24}$, $R^{25}$ and $R^{26}$ each represent an alkyl group or an alkoxy group, and at least one group selected from among $R^{24}$, $R^{25}$ and $R^{26}$ is an alkoxy group. Preferably, at least two groups selected from among $R^{24}$, $R^{25}$ and $R^{26}$ are alkoxy groups. More preferably, $R^{24}$, $R^{25}$ and $R^{26}$ are alkoxy groups.

$R^{24}$, $R^{25}$ and $R^{26}$ are each an alkyl group or alkoxy group preferably having 1 to 8, more preferably 1 to 6, even more preferably 1 to 4, and particularly preferably 1 to 2 carbon atoms.

Examples of the alkyl group of $R^{24}$, $R^{25}$ and $R^{26}$ include a methyl group, an ethyl group, a n-propyl group, an isopropyl group, a n-butyl group, an isobutyl group, a sec-butyl group, a tert-butyl group, a n-pentyl group, a n-hexyl group, and a n-octyl group. A methyl group and an ethyl group are preferred.

Examples of the alkoxy group of $R^{24}$, $R^{25}$ and $R^{26}$ include a methoxy group, an ethoxy group, a n-propoxy group, and a n-butoxy group. A methoxy group and an ethoxy group are preferred.

Preferably, $R^{24}$, $R^{25}$ and $R^{26}$ are groups each selected from the group consisting of a methoxy group, an ethoxy group, a methyl group, and an ethyl group and at least two groups selected from among $R^{24}$, $R^{25}$ and $R^{26}$ are each a methoxy group or an ethoxy group. More preferably, $R^{24}$, $R^{25}$ and $R^{26}$ are each a methoxy group or an ethoxy group.

In Formula (2-S), k represents an integer of 1 to 5, preferably 2 or 3.

Examples of groups represented by Formula (2-S) include a 2-trimethoxysilylethyl group, a 3-trimethoxysilylpropyl group, a 3-triethoxysilylpropyl group, and a 3-dimethoxymethylsilylpropyl group.

Among compounds represented by Formula (2), examples of compounds in which A is a dialkylthiocarbamyl group include γ-trimethoxysilylpropyldimethylthiocarbamyltetrasulfide. Examples of compounds in which A is a thiazolyl group include γ-trimethoxysilylpropylthiazolyltetrasulfide. Examples of compounds in which A is a benzothiazolyl group include γ-trimethoxysilylpropylbenzothiazolyltetrasulfide.

Among compounds represented by Formula (2), examples of compounds in which A is a group represented by Formula (2-S) include compounds represented by Formula (2-1):

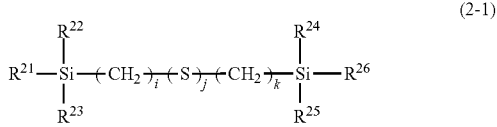

(2-1)

wherein $R^{21}$, $R^{22}$ and $R^{23}$ each represent an alkyl group or an alkoxy group, at least one group selected from among $R^{21}$, $R^{22}$ and $R^{23}$ is an alkoxy group, $R^{24}$, $R^{25}$ and $R^{26}$ each represent an alkyl group or an alkoxy group, at least one group selected from among $R^{24}$, $R^{25}$ and $R^{26}$ is an alkoxy group, i represents an integer of 1 to 5, j represents an integer of 2 to 8, and k represents an integer of 1 to 5.

Examples of compounds represented by Formula (2-1) include bis(3-triethoxysilylpropyl)disulfide, bis(3-triethoxysilylpropyl)tetrasulfide, and bis(3-dimethoxymethylpropyl)tetrasulfide.

Commercial products of compounds represented by Formula (2-1) include those with commercial names Si69 and Si75 produced by Degussa Co., Ltd.

Alkoxysilane compounds containing a polysulfide group are preferably compounds represented by Formula (2-1), and more preferably compounds wherein $R^{21}$, $R^{22}$, $R^{23}$, $R^{24}$, $R^{25}$ and $R^{26}$ are groups each selected from the group consisting of a methoxy group, an ethoxy group, a methyl group, and an ethyl group, at least two groups selected from among $R^{21}$, $R^{22}$ and $R^{23}$ are each a methoxy group or an ethoxy group, at least two groups selected from among $R^{24}$, $R^{25}$ and $R^{26}$ are each a methoxy group or an ethoxy group, i is an integer of 1 to 5, j is an integer of 2 to 8, and k is an integer of 1 to 5. More preferred are compounds represented by Formula (2-1) wherein $R^{21}$, $R^{22}$, $R^{23}$, $R^{24}$, $R^{25}$ and $R^{26}$ are each a methoxy group or an ethoxy group, i is 2 or 3, j is an integer 2 to 5, and k is 2 or 3.

Bis(3-triethoxysilylpropyl)disulfide and bis(3-triethoxysilylpropyl)tetrasulfide are particularly preferred as alkoxysilane compounds containing a polysulfide group.

In the present invention, one or more kinds of silane coupling agents are used.

<Silica>

Examples of the silica in the present invention include dry process silica (silicic acid anhydride), wet process silica (hydrous silicic acid), colloidal silica, precipitated silica, calcium silicate, and aluminum silicate. One or more kinds of silica are used. The BET specific surface area of the silica is preferably 50 to 250 $m^2/g$. The BET specific surface area is measured in accordance with ASTM D1993-03. As a commercially available product, there are used, for example, a product available under the commercial name of ULTRASIL VN3-G produced by Degussa Co., Ltd., products available under the commercial names of VN3, AQ, ER, and RS-150 produced by Tosoh Silica Corporation, and products available under the commercial names of Zeosil 1115 MP and Zeosil 1165 MP produced by Rhodia.

<Process for Preparation of Pre-Kneaded Rubber Composition>

The pre-kneaded rubber composition in the present invention is a rubber composition produced by kneading a butadiene-based rubber and 1 part by weight to 20 parts by weight of a silane coupling agent per 100 parts by weight of the butadiene-based rubber. The amount of the silane coupling agent to be kneaded to the butadiene-based rubber is 1 part by weight to 20 parts by weight, preferably 3 parts by weight to 10 parts by weight per 100 parts by weight of the butadiene-based rubber.

The butadiene-based rubber and the silane coupling agent are kneaded preferably with a kneading machine. Examples of the kneading machine include a Banbury mixer, a Labo Plastomill, a kneader, a roll kneading machine, and a twin screw extruder. The temperature at which the butadiene-based rubber and the silane coupling agent are kneaded is preferably 160° C. or lower, more preferably 130° C. or lower.

The temperature at which the butadiene-based rubber and the silane coupling agent are kneaded is preferably 30° C. or higher, more preferably 50° C. or higher, and even more preferably 90° C. or higher. Preferably, the time for which the butadiene-based rubber and the silane coupling agent are kneaded is 1 minute or more and 20 minutes or less. It is preferred to knead the butadiene-based rubber and the silane coupling agent at 160° C. or lower for 1 minute to 20 minutes.

Polymers other than the butadiene-based rubber may be kneaded with the butadiene-based rubber and the silane coupling agent. Examples of such polymers include isoprene rubbers, such as natural rubber, polyisoprene rubber (IR), and styrene-isoprene copolymer rubber; chloroprene rubber (CR); ethylene-propylene-diene rubber (EPDM); and ethylene-α-olefin copolymers, such as ethylene-propylene copolymers and ethylene-octene copolymers. When kneading such a polymer, the amount of the polymer to be kneaded per 100 parts by weight of the butadiene-based rubber is preferably 20 parts by weight or less, more preferably 10 parts by weight or less, even more preferably 5 parts by weight or less, and particularly preferably 2 parts by weight or less.

In the step of producing the pre-kneaded rubber composition, additives, such as carbon black, a filler other than silica, an antiaging agent, zinc oxide, stearic acid, an extending oil, a processing aid, and a lubricant, may be kneaded with the butadiene-based rubber and the silane coupling agent.

Examples of such carbon black include channel carbon black such as EPC, MPC, and CC; furnace carbon black, such as SAF, ISAF, HAF, MAF, FEF, SRF, GPF, APF, FF, CF, SCF, and ECF; thermal carbon black, such as FT and MT; acetylene carbon black; and graphite. Two or more kinds of carbon black may be used.

The nitrogen adsorption specific surface area ($N_2SA$) of carbon black is preferably 5 to 200 $m^2/g$ and the dibutyl phthalate (DBP) absorption of carbon black is preferably 5 to 300 ml/100 g. The nitrogen adsorption specific surface area is measured in accordance with ASTM D4820-93. The DBP absorption is measured in accordance with ASTM D2414-93. As a commercially available product, there can be used, for example, a product available under the commercial name of DIABLACK N339 produced by Mitsubishi Chemical Corporation, products available under the commercial names of SEAST 6, SEAST 7HM and SEAST KH produced by Tokai Carbon Co., Ltd., and products available under the commercial names of CK3 and Special Black 4A produced by Degussa Co., Ltd.

Examples of such a filler include calcium carbonate, talc, alumina, clay, aluminum hydroxide, and mica.

Examples of such an extending oil include aromatic mineral oils (viscosity-gravity constant (V. G. C.): 0.900 to 1.049), naphthene-based mineral oils (V. G. C.: 0.850 to 0.899), and paraffin-based mineral oils (V. G. C.: 0.790 to 0.849). The content of a polycyclic aromatic compound in the extending oil is preferably less than 3% by weight, more preferably less than 1% by weight. The content of the polycyclic aromatic compound is measured in accordance with the IP 346/92 method of The Institute of Petroleum. The content of aromatic compounds (CA) of the extending oil is preferably 20% by weight or more. Two or more kinds of extending oils may be used.

In the step of producing the pre-kneaded rubber composition, although it is preferred not to knead silica together with the butadiene-based rubber and the silane coupling agent, silica may be kneaded if the amount thereof is small. In order to produce a vulcanized rubber composition superior in fuel saving efficiency and gripping property, the amount of silica that may be kneaded in this step is preferably 20 parts by weight or less, more preferably 10 parts by weight or less, even more preferably 5 parts by weight or less, and particularly preferably 2 parts by weight or less per 100 parts by weight of the butadiene-based rubber.

When silica is kneaded in the step of producing the pre-kneaded rubber composition, the pre-kneaded rubber composition may be produced by kneading silica, the silane coupling agent and the butadiene-based rubber together at the same time or alternatively the pre-kneaded rubber composition may be produced by kneading silica and the butadiene-based rubber first to produce a kneaded material, and then kneading the silane coupling agent to the resulting kneaded material.

<Step of Kneading Silica and Pre-Kneaded Rubber Composition>

The method for producing the rubber composition of the present invention has a step of kneading the pre-kneaded rubber composition produced in the above-described step and 30 parts by weight to 200 parts by weight of a silica per 100 parts by weight of the butadiene-based rubber used for producing the pre-kneaded rubber composition.

The silica and the pre-kneaded rubber composition are kneaded preferably with a kneading machine. Examples of the kneading machine include a Banbury mixer, a Labo Plastomill, a kneader, a roll kneading machine, and a twin screw extruder. The temperature at which the silica and the pre-kneaded rubber composition are kneaded is preferably 160° C. or lower, more preferably 130° C. or lower, and preferably 30° C. or higher, more preferably 50° C. or higher, and even more preferably 90° C. or higher. The time for kneading the silica and the pre-kneaded rubber composition is preferably from 30 seconds to 20 minutes, more preferably one minute or longer.

The amount of the silica to be kneaded in the step of kneading the silica and the pre-kneaded rubber composition is 30 parts by weight to 200 parts by weight, preferably 50 parts by weight to 150 parts by weight, more preferably 70 parts by weight to 120 parts by weight per 100 parts by weight of the butadiene-based rubber used for producing the pre-kneaded rubber composition to be used in this step.

In the step of kneading the silica and the pre-kneaded rubber composition, it is also permitted to knead a butadiene-based rubber, a polymer other than the butadiene-based rubber, and the aforementioned additive with the silica and the pre-kneaded rubber composition. Moreover, it is also permitted to provide, after the step of kneading the silica and the pre-kneaded rubber composition, a step of kneading the rubber composition produced by the preceding step, a butadiene-based rubber, a polymer other than the butadiene-based rubber, and the aforementioned additive.

The overall amount of the butadiene-based rubber and the polymer (s) other than the butadiene-based rubber to be kneaded in the step of kneading the silica and the pre-kneaded rubber composition and the post step of this step is preferably 20 parts by weight or less, more preferably 10 parts by weight or less, and even more preferably 5 parts by weight or less per 100 parts by weight of the butadiene-based rubber used for producing the pre-kneaded rubber composition.

<Step of Producing Vulcanizable Rubber Composition>

The rubber composition produced by the method described above and a vulcanizing agent are kneaded, thereby producing a vulcanizable rubber composition.

Examples of such a vulcanizing agent include sulfur, powdered sulfur, precipitated sulfur, colloidal sulfur, insoluble sulfur, and highly dispersible sulfur. The amount of the vulcanizing agent to be kneaded is preferably 0.1 parts by weight to 15 parts by weight, more preferably 0.3 parts by weight to 10 parts by weight, and even more preferably 0.5 parts by weight to 5 parts by weight per 100 parts by weight of the polymer components used for producing the rubber composition to be used for the kneading. The polymer component as used herein means a butadiene-based rubber or collectively means a butadiene-based rubber and a polymer other than the butadiene-based rubber when using the polymer.

In the step of producing the vulcanizable rubber composition, a vulcanization accelerator may be kneaded with the rubber composition and the vulcanizing agent.

Examples of such a vulcanization accelerator include thiazole-based vulcanization accelerators, such as 2-mercaptobenzothiazole, dibenzothiazyldisulfide, and N-cyclohexyl-2-benzothiazylsulfenamide; thiuram-based vulcanization accelerators, such as tetramethylthiurammonosulfide and tetramethylthiuramdisulfide; sulfenamide-based vulcanization accelerators, such as N-cyclohexyl-2-benzothiazolesulfenamide, N-tert-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; guanidine-based vulcanization accelerators, such as diphenylguanidine, diorthotolylguanidine, and orthotolylbiguanidine.

The method of kneading the rubber composition and the vulcanizing agent may be a method of kneading the rubber composition and the vulcanizing agent by using a kneading machine such as a Banbury mixer, a Labo Plastomill, and a roll kneading machine. The kneading temperature is preferably 10° C. to 100° C., more preferably 20° C. to 80° C. The kneading time is preferably 30 seconds to 30 minutes, more preferably 1 minute to 20 minutes.

<Step of Producing Vulcanized Rubber Composition>

A vulcanized rubber composition is produced by heating the vulcanizable rubber composition produced by the above-described method.

The method of heating the vulcanizable rubber composition may preferably be press vulcanization. In the general press vulcanization, a pair of molds is used and the molds are heated at X° C.±0.5° C., wherein X° C. is a vulcanization temperature, usually for 20 minutes or more. The vulcanizable rubber composition is placed between the heated molds and then the molds are closed, thereby pressing the vulcanizable rubber. At the start of vulcanization, an operation of applying and removing pressure by closing and opening the molds is repeated twice or thrice in order to remove bubbles in the vulcanizable rubber. The vulcanization time is a time from the moment when the pressure applied to the vulcanizable rubber has reached a prescribed pressure to the moment when the pressure is removed after the completion of the vulcanization. After the completion of the vulcanization, the molds are opened and then a sheet made of the vulcanized rubber composition is taken out immediately. The sheet taken out is cooled in water or cooled by being left at rest on a metal plate for 10 to 15 minutes. The temperature at which the vulcanizable rubber is heated is preferably 120 to 200° C., more desirably 140 to 180° C. The pressure under which the vulcanizable rubber is compressed is usually 3.5 MPa or higher, preferably 4 MPa or higher. The time of vulcanizing the vulcanizable rubber is preferably 10 minutes to 2 hours, more preferably 30 minutes to 1 hour.

When a polymer other than the butadiene-based rubber is used in the method for producing the vulcanized rubber composition of the present invention, the amount of the polymer other than the butadiene-based rubber to be used in all the steps is preferably 500 parts by weight or less, more preferably 300 parts by weight or less per 100 parts by weight of the butadiene-based rubber to be used in all the steps.

The vulcanized rubber composition produced by the method of the present invention is superior in fuel saving efficiency. It is superior also in gripping property.

Vulcanized rubber compositions produced by the method of the present invention are used for tire, shoe soles, flooring materials, vibration isolating materials, and so on, and particularly they are used suitably for tire.

EXAMPLES

Evaluation of physical properties was performed by the following methods.

1. Mooney Viscosity ($ML_{1+4}$)

In accordance with JIS K6300 (1994), the Mooney viscosity of a polymer was measured at 100° C.

2. Content of Repeating Units Derived from Styrene (Unit: % by Weight)

In accordance with JIS K6383 (1995), the content of repeating units derived from styrene in a polymer was calculated from an index of refraction thereof.

3. Fuel Saving Efficiency

A strip-like specimen 4 mm wide, 40 mm long, 1.2 mm thick was punched out from a sheet made of a vulcanized rubber composition and then it was subjected to a test. The loss tangent (tan δ (70° C.)) of the specimen at a temperature of 70° C. was measured under the condition represented by a strain of 1% and a frequency of 10 Hz by using a viscoelasticity analyzer (manufactured by Ueshima Seisakusho Co., Ltd.). The smaller this value, the better the fuel saving efficiency is.

4. Gripping Property

A strip-like specimen 4 mm wide, 40 mm long, 1.2 mm thick was punched out from a sheet made of a vulcanized rubber composition and then it was subjected to a test. The loss tangent (tan δ (0° C.)) of the specimen at a temperature of 0° C. was measured under the condition represented by a strain of 2.5% and a frequency of 10 Hz by using a viscoelasticity analyzer (manufactured by Ueshima Seisakusho Co., Ltd.). The larger this value, the better the gripping property is.

The butadiene-based rubbers, silica, silane coupling agents, and other additives used in Examples and Comparative Examples are as follows.

(a) Butadiene-Based Rubber

SBR-A: Styrene-butadiene copolymer produced by Sumitomo Chemical Co., Ltd. Mooney viscosity: ($ML_{1+4}$ (100° C.)) 75, content of repeating units derived from styrene: 25% by weight.

SBR-B: Styrene-butadiene copolymer with its polymer chain terminals modified with an amide compound, produced by Sumitomo Chemical Co., Ltd. Mooney viscosity: ($ML_{1+4}$ (100° C.)) 70, content of repeating units derived from styrene: 22% by weight.

(b) Silica

Commercial name: ULTRASIL VN3-G, produced by Degussa Co., Ltd.

(c) Silane Coupling Agent

Bis(3-triethoxysilylpropyl)tetrasulfide (commercial name: Si69, produced by Degussa Co., Ltd.).

(d) Carbon Black

Commercial name: DIABLACK N339, produced by Mitsubishi Chemical Corporation (e) Extending Oil Commercial name: JOMO PROCESS NC-140, produced by Japan Energy Corporation (f) Antioxidant Commercial name: ANTIGENE 3C, produced by Sumitomo Chemical Co., Ltd.

(g) Stearic Acid

Commercial name: STEARIC ACID 50S, produced by New Japan Chemical Co., Ltd.

(h) Zinc Oxide

Commercial name: ZINC OXIDE, produced by Seido Chemical Industry Co., Ltd (i) Wax Commercial name: SUNNOC N, produced by Ouchi Shinko Chemical Industrial Co., Ltd.

(j) Vulcanization Accelerator

Commercial name: SOXINOL CZ, produced by Sumitomo Chemical Co., Ltd.

Commercial name: SOXINOL D, produced by Sumitomo Chemical Co., Ltd.

(k) Sulfur

Commercial name: SULFUR POWDER, produced by Tsurumi Chemical Industry Co., Ltd.

Example 1

One hundred parts by weight of SBR-A and 6.4 parts by weight of a silane coupling agent were kneaded for five minutes with a 10-inch roll set at 105° C. to obtain a kneaded material. Then, the kneaded material was fed into a Labo Plastomill set at 70° C. and kneading was started. The temperature of the kneaded material reached 90° C. in 50 seconds from the start of the kneading. Kneading was continued after that, and when the temperature of the kneaded material reached 120° C. at the time of 2 minutes and 30 seconds from the start of the kneading, kneading was ended and then the kneaded material was cooled to room temperature, so that a pre-kneaded rubber composition was produced.

The pre-kneaded rubber composition was fed to a Labo Plastomill set at 70° C. and kneading was started. Where the amount of the SBR-A used for producing the pre-kneaded rubber composition is 100 parts by weight, 78.4 parts by weight of a silica, 6.4 parts by weight of carbon black, 47.6 parts by weight of an extending oil, 1.5 parts by weight of an antioxidant, and 2 parts of stearic acid were fed to the Labo Plastomill in two lots at 30 seconds and at 1 minute and 30 seconds from the start of kneading and then they were kneaded with the pre-kneaded rubber composition. The temperature of the kneaded material reached 90° C. in 2 minutes and 10 seconds from the start of the kneading. Kneading was thereafter continued and when the temperature of the kneaded material reached 120° C. at the time of 4 minutes and 10 seconds from the start of the kneading, kneading was ended, so that a rubber composition was produced. Then, where the amount of the SBR-A used for the preparation of the pre-kneaded rubber composition used for the preparation of the rubber composition is 100 parts by weight, 2 part of zinc oxide and 1.5 parts by weight of wax were added to the rubber composition and kneaded for 10 minutes with a 10-inch roll set at 70° C., so that a rubber composition was produced.

Where the amount of the SBR-A used for the preparation of the pre-kneaded rubber composition used for the preparation of the rubber composition is 100 parts by weight, 1.4 parts by weight of sulfur and 2 part of vulcanization accelerators (1 part by weight of SOXINOL CZ and 1 part by weight of SOXINOL D) were added to the rubber composition and they were kneaded for 10 minutes with a 10-inch roll set at 50° C., so that a vulcanizable rubber composition was obtained.

The vulcanizable rubber composition was molded with a 10-inch roll, thereby obtaining a sheet made of the composition. Then, the sheet was pressed at 160° C., 4 MPa for 45 minutes, so that a sheet made of a vulcanized rubber composition 150 mm wide, 150 mm long, and 1.2 mm thick was prepared.

Comparative Example 1

SBR-A was fed to a Labo Plastomill set at 70° C. and kneading was started. 78.4 Parts by weight of a silica, 6.4 parts by weight of a silane coupling agent, 6.4 parts by weight of carbon black, 47.6 parts by weight of an extending oil, 1.5 parts by weight of an antioxidant, and 2 parts of stearic acid per 100 parts by weight of the aforementioned SBR-A were fed to the Labo Plastomill in two lots at 30 seconds and at 1 minute and 30 seconds from the start of kneading and they were kneaded with the SBR-A. The temperature of the kneaded material reached 90° C. in 2 minutes and 30 seconds from the start of the kneading. Kneading was thereafter continued and when the temperature of the kneaded material reached 120° C. at the time of 4 minutes and 20 seconds from the start of the kneading, kneading was ended, so that a rubber composition was obtained. Then, where the amount of the SBR-A used for the preparation of the rubber composition is 100 parts by weight, 2 part of zinc oxide and 1.5 parts by weight of wax were added to the rubber composition and then they were kneaded for 10 minutes with a 10-inch roll set at 70° C., so that a rubber composition was obtained.

Where the amount of the SBR-A used for the preparation of the rubber composition is 100 parts by weight, 1.4 parts by weight of sulfur and 2 part of vulcanization accelerators (1 part by weight of SOXINOL CZ and 1 part by weight of SOXINOL D) were added to the rubber composition and they were kneaded for 10 minutes with a 10-inch roll set at 50° C., so that a vulcanizable rubber composition was obtained.

The vulcanizable rubber composition was molded with a 10-inch roll, thereby obtaining a sheet made of the composition. Then, the sheet was pressed at 160° C., 4 MPa for 45 minutes, so that a sheet made of a vulcanized rubber composition 150 mm wide, 150 mm long, and 1.2 mm thick was prepared.

Comparative Example 2

SBR-A was fed to a Labo Plastomill set at 70° C. and kneading was started. 78.4 parts by weight of a silica, 6.4 parts by weight of carbon black, 47.6 parts by weight of an extending oil, 1.5 parts by weight of an antioxidant, and 2 parts of stearic acid per 100 parts by weight of the SBR-A were fed to the Labo Plastomill in two lots at 30 seconds and at 1 minute and 30 seconds from the start of kneading and they were kneaded with the SBR-A. The temperature of the kneaded material reached 90° C. in 2 minutes and 30 seconds from the start of the kneading. Kneading was continued after that and when the temperature of the kneaded material reached 120° C. at the time of 4 minutes and 30 seconds from the start of the kneading, kneading was ended, followed by cooling to room temperature, so that a rubber composition was obtained.

The rubber composition and a silane coupling agent in an amount of 6.4 parts by weight per 100 parts by weight of the SBR-A used for the preparation of the rubber composition were fed to a Labo Plastomill set at 70° C. and kneading was started. The temperature of the kneaded material reached 90° C. in 40 seconds from the start of the kneading. Kneading was thereafter continued and when the temperature of the kneaded material reached 120° C. at the time of 1 minute and 50 seconds from the start of the kneading, kneading was ended, so that a rubber composition was obtained. Then, where the amount of the SBR-A used for the preparation of the rubber composition is 100 parts by weight, 2 part of zinc oxide and 1.5 parts by weight of wax were added to the rubber composition and they were kneaded for 10 minutes with a 10-inch roll set at 70° C., so that a rubber composition was obtained.

Where the amount of the SBR-A used for the preparation of the rubber composition is 100 parts by weight, 1.4 parts by weight of sulfur and 2 part of vulcanization accelerators (1 part by weight of SOXINOL CZ and 1 part by weight of SOXINOL D) were added to the rubber composition and then they kneaded for 10 minutes with a 10-inch roll set at 50° C., so that a vulcanizable rubber composition was obtained.

The vulcanizable rubber composition was molded with a 10-inch roll, obtaining a sheet made of the composition. Then, the sheet was pressed at 160° C., 4 MPa for 45 minutes, so that a sheet made of a vulcanized rubber composition 150 mm wide, 150 mm long, and 1.2 mm thick was prepared.

The results of property evaluation of the sheets made of the vulcanized rubber compositions obtained in Example 1, Comparative Example 1, and Comparative Example 2, respectively are shown in Table 1.

TABLE 1

| Item of evaluation | Example 1, | Comparative Example 1 | Comparative Example 2 |
|---|---|---|---|
| Fuel saving efficiency (tanδ at 70° C.) | 0.148 | 0.168 | 0.153 |
| Gripping property (tanδ at 0° C.) | 0.453 | 0.419 | 0.435 |

Example 2

One hundred parts by weight of SBR-B and 6.4 parts by weight of a silane coupling agent were kneaded for five minutes with a 10-inch roll set at 105° C. to obtain a kneaded material. Then, the kneaded material was fed into a Labo Plastomill set at 70° C. and kneading was started. The temperature of the kneaded material reached 90° C. in 1 minutes and 10 seconds from the start of the kneading. Kneading was continued after that, and when the temperature of the kneaded material reached 120° C. at the time of 2 minutes and 50 seconds from the start of the kneading, kneading was ended and then the kneaded material was cooled to room temperature, so that a pre-kneaded rubber composition was produced.

The pre-kneaded rubber composition was fed to a Labo Plastomill set at 70° C. and kneading was started. Where the amount of the SBR-B used for producing the pre-kneaded rubber composition is 100 parts by weight, 78.4 parts by weight of a silica, 6.4 parts by weight of carbon black, 47.6 parts by weight of an extending oil, 1.5 parts by weight of an antioxidant, and 2 parts of stearic acid were fed to the Labo Plastomill in two lots at 30 seconds and at 1 minute and 30 seconds from the start of kneading and then they were kneaded with the pre-kneaded rubber composition. The temperature of the kneaded material reached 90° C. in 0.2 minutes and 20 seconds from the start of the kneading. Kneading was thereafter continued and when the temperature of the kneaded material reached 120° C. at the time of 4 minutes and 10 seconds from the start of the kneading, kneading was ended, so that a rubber composition was obtained. Then, where the amount of the SBR-B used for the preparation of the rubber composition is 100 parts by weight, 2 part of zinc oxide and 1.5 parts by weight of wax were added to the rubber composition and then they were kneaded for 10 minutes with a 10-inch roll set at 70° C., so that a rubber composition was obtained.

To the rubber composition were added 1.4 parts by weight of sulfur and 2 part of vulcanization accelerators (1 part by weight of SOXINOL CZ and 1 part by weight of SOXINOL D) per 100 parts by weight of the SBR-B contained in the rubber composition, followed by kneading for 10 minutes with a 10-inch roll set at 50° C., so that a vulcanizable rubber composition was obtained.

The vulcanizable rubber composition was molded with a 10-inch roll, obtaining a sheet made of the composition. Then, the sheet was heated at 160° C., 4 MPa for 45 minutes, so that a sheet made of a vulcanized rubber composition 150 mm wide, 150 mm long, and 1.2 mm thick was prepared.

The results of property evaluation of the sheet made of the vulcanized rubber composition obtained in Example 2 are shown in Table 2.

TABLE 2

| Item of evaluation | Example 2 |
|---|---|
| Fuel saving efficiency (tanδ at 70° C.) | 0.148 |
| Gripping property (tanδ at 0° C.) | 0.660 |

The invention claimed is:

1. A method for producing a rubber composition, the method comprising a step of producing a pre-kneaded rubber composition by kneading a butadiene-based rubber and 1 to 20 parts by weight of a silane coupling agent per 100 parts by weight of the butadiene-based rubber, wherein no silica is kneaded together with the butadiene-based rubber and silane coupling agent and the pre-kneaded rubber composition contains no filler, and a step of kneading the pre-kneaded rubber composition and 30 to 200 parts by weight of a silica per 100 parts by weight of the butadiene-based rubber used for producing the pre-kneaded rubber composition.

2. The method according to claim 1, wherein the silane coupling agent is an alkoxysilane compound having a sulfur-containing group.

3. The method according to claim 1, wherein in the step of producing a pre-kneaded rubber composition, the butadiene-based rubber and the silane coupling agent are kneaded at 160° C. or lower for 1 to 20 minutes.

4. A method for producing a vulcanizable rubber composition, the method comprising a step of kneading a vulcanizing agent and a rubber composition produced by the method according to claim 1.

5. A method for producing a vulcanized rubber composition, the method comprising a step of heating a vulcanizable rubber composition produced by the method according to claim 4.

6. The method according to claim 2, wherein in the step of producing a pre-kneaded rubber composition, the butadiene-based rubber and the silane coupling agent are kneaded at 160° C. or lower for 1 to 20 minutes.

7. A method for producing a vulcanizable rubber composition, the method comprising a step of kneading a vulcanizing agent and a rubber composition produced by the method according to claim 2.

8. A method for producing a vulcanizable rubber composition, the method comprising a step of kneading a vulcanizing agent and a rubber composition produced by the method according to claim 3.

* * * * *